Feb. 9, 1943.  W. H. TAYLOR  2,310,603

SAND COOLER

Filed May 21, 1942

INVENTOR.
W. H. Taylor
BY Lieber & Lieber
ATTORNEYS.

Patented Feb. 9, 1943

2,310,603

UNITED STATES PATENT OFFICE 2,310,603

SAND COOLER

William H. Taylor, Waukesha County, Wis., assignor to The Vilter Manufacturing Company, Milwaukee, Wis., a corporation of Wisconsin Application May 21, 1942, Serial No. 443,901

5 Claims. (Cl. 259—3)

The present invention relates in general to improvements in the art of treating granular material, and relates more specifically to an improved system for continuously cooling sand, gravel or other similar materials.

The primary object of this invention is to provide simple and efficient apparatus for cooling granular materials such as sand or gravel, while the material is being transported in bulk from one place to another in the form of an uninterrupted stream.

When building concrete structures in localities where high temperatures prevail, it is highly desirable to have the concrete aggregate in relatively cool condition when the concrete mixture is being produced and poured. While a number of methods of cooling concrete mix under such conditions have heretofore been proposed and used successfully, the cost of refrigeration has been excessive with all of these prior systems and their use has been prohibitive in many instances. In accordance with the most practical prior method of concrete aggregate cooling, disintegrated artificial ice was injected into the mixture of sand and/or gravel, crushed stone and cement, while this mix was being conveyed to the structural forms; and in many cases the mixture of ingredients was not uniformly cooled, while in all instances the cost of refrigeration was enormous because it was necessary to first produce the ice and considerable melting and loss of cooling effect occurred before the ice was properly disintegrated and delivered to the place of utilization. I have discovered that this excessive cost of refrigeration can be obviated by continuously pre-cooling the sand or gravel which either constitutes a major portion of the concrete mix, or which at least comprises a large part of the bulk mixture and must be thoroughly distributed throughout the concrete mix when the concrete is finally poured. With such an improved system, cooling can be effected uniformly throughout the mass and refrigeration lossses are minimized.

It is therefore a more specific object of my present invention, to provide an improved sand or gravel cooling system especially applicable to the treatment of concrete aggregate, and which can be operated at maximum efficiency and at minimum cost.

Another specific object of the present invention is to provide improved compact cooling apparatus capable of automatically treating large quantities of granular material in bulk, and wherein the material being cooled is also effectively cleansed.

A further specific object of this invention is to provide durable and efficient mechanism for continuously cooling and agitating sand or the like, and which can be installed and operated at moderate cost.

Still another specific object of the invention is to provide an improved counterflow cooling and washing system for granular material such as sand or gravel, which is operable with minimum skill and attention, to uniformly and effectively cool the product being treated.

These and other specific objects and advantages of the present invention will be apparent in the course of the following description.

A clear conception of the several features constituting my improved cooling system and of the construction and operation of a typical mechanism embodying the invention, may be had by referring to the drawing accompanying and forming a part of this specification, wherein like reference characters designate the same or similar parts in the various views.

Figure 1:
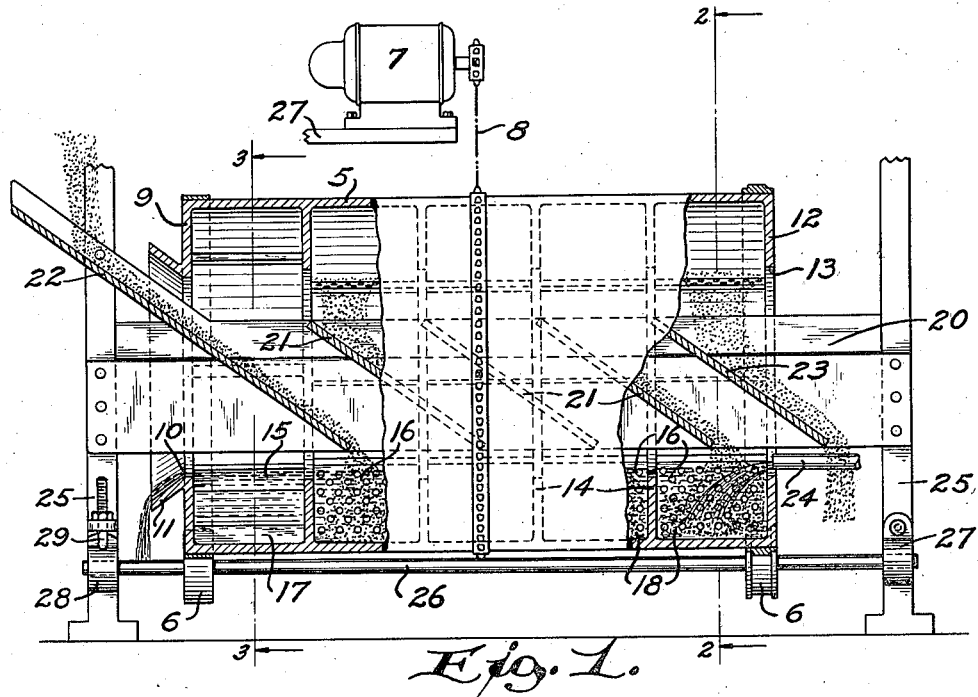
Fig. 1 is a part sectional side elevation of one of my improved sand washing, mixing and cooling units.
Figure 2:
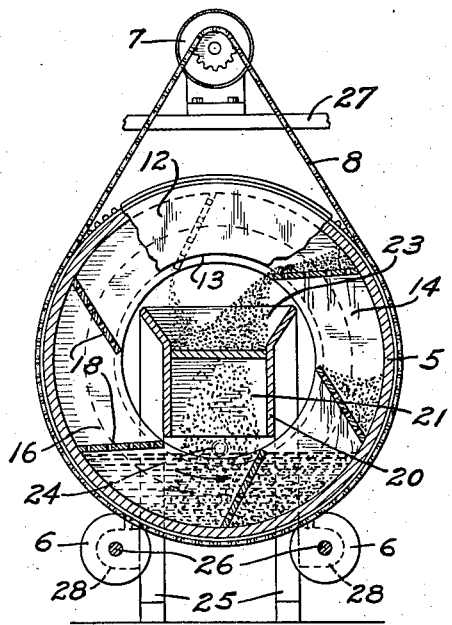
Fig. 2 is a transverse vertical section through the sand discharge end of the cooler of Fig. 1, taken along the line 2—2.
Figure 3:
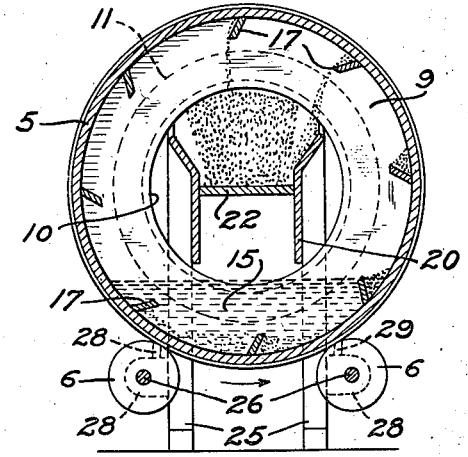
Fig. 3 is a transverse vertical section through the sand inlet end of the same machine, taken along the line 3—3 of Fig. 1.

Although the invention has been shown and described herein by way of illustration, as having been embodied in a typical system for automatically cooling a continuous stream of sand used in the production of concrete, it is not my desire or intent to thereby unnecessarily limit the scope or utility of the improvement many features of which are obviously more generally applicable to other treatment of bulk materials.

Referring to the drawing, the typical sand cooling system depicted therein comprises in general a hollow cylinder or drum 5 continuously rotatable about its slightly inclined longitudinal axis upon supporting rollers 6 by means of an electric motor 7 or the like through a slow speed transmission mechanism such as a chain drive 8; a sand inlet end head 9 having a central opening 10 provided with an annular liquid overflow outlet discharge flange 11; a sand discharge or outlet end head 12 having a central opening 13 of somewhat larger diameter than the inlet opening 10, and providing an inlet for introducing cold fresh liquid to the interior of the drum 5; a series of annular partitions 14 dividing the interior of the drum 5 between the end heads 9, 11 into successive chambers or compartments 15, 16 of which the initial or settling compartment 15 has a series of imperforate narrow lifting vanes 17 therein while the washing and cooling compartments 16 each has a series of perforated wider elevating flights or vanes 18 therein; a stationary horizontal trough or hopper member 20 having a succession of inclined chutes 21 therein for advancing cascading sand from each compartment to the next succeeding compartment 16; a warm sand supply chute 22 associated with the inlet end of the hopper member 20 and extending from the exterior of the drum 5 through the opening 10 and compartment 15 into the first cooling compartment 16; a finally cooled sand discharge chute 23 associated with the outlet end of the hopper member 20 and extending across the final cooling compartment 16 and through the opening 12 to the exterior of the unit; and a cold water supply pipe 24 leading into the final treating chamber 16 through the opening 12.

The rotary drum 5 may be formed of sheet metal of any desired diameter and length, and the number and size of the annular chambers 15, 16 may be varied to suit requirements. The annular partitions 14 and the end heads 9, 12 provide a central or axial circular passage extending throughout the entire length of the cooling unit, and the fixed hopper member 20 and chutes 21, 22, 23 are surrounded by the annular chambers 15, 16 and are disposed within the central through passage. These stationary or fixed elements are supported upon a frame 25 which also supports shafts 26 upon which the rollers 6 are mounted, and the shafts 26 are mounted in bearings 27, 28 of which the bearings 27 are pivotally suspended from the frame 25 while the opposite bearings 28 are vertically adjustable by means of jack screws 29. Each of the inclined chutes 21 extends entirely across one of the chambers 16 and into the next adjacent chamber. The propelling motor 7 may also be mounted upon a fixed support 27, and is adapted to slowly and continuously revolve the drum 5 through the speed reducing chain drive 8 and upon the rollers 6 without interference by the internal fixed structure or hopper member 20. The vanes 17, 18 are formed so that they will elevate granular material from their respective compartments 15, 16 during rotation of the drum 5, and will eventually shower or cascade the elevated material upon the adjacent chutes 22, 21, 23; and while the narrow vanes 17 will lift slight quantities of liquid with the sand, the perforated wider vanes 18 will permit the liquid and fine sand to drain back into the corresponding compartments 16, and will thereby prevent return of the warm liquid to chambers containing cooler water. While the first compartment 15 is primarily a settling basin or chamber for the fine sand particles, the other compartments 16 are mixing, agitating and cooling chambers.

During normal operation of the improved sand cooler and washer, the jack screws 29 should first be adjusted so as to incline the longitudinal axis of the drum 5 sufficient to cause liquid admitted from the supply pipe 24 to flow over the partitions 14 and through the smaller opening 10 in the end head 9, without escaping through the opening 13 of the other end head 12. Since the opening 10 is only slightly smaller than the opening 13, the inclination of the drum axis will only be slight, and the drum 5 should thereafter be constantly rotated about its slightly inclined longitudinal axis and upon the anti-friction rollers 6, by means of the motor 7 which coacts with the drum periphery through the chain drive 8. Relatively warm sand may then be constantly deposited upon the inlet chute 22, and fresh cold liquid such as water should be constantly delivered into the drum compartment 16 farthest from the sand supply chute 22, and this fresh liquid after filling the compartment 16 nearest the supply pipe 24, will flow over the successive partitions 14 and will fill the lower portions of all of the chambers 15, 16. When the inclination of the drum axis has been properly adjusted, the cooling liquid thus constantly admitted from the supply pipe 24, should continue to flow through the drum 5 in a direction opposite to the direction of advancement of the granular material, and the warmest liquid will always be nearest the sand inlet end of the drum. The admitted warm sand slides downwardly along the fixed supply chute 22 through the opening 10 and chamber 15, and is deposited in the liquid within the lower portion of the first compartment 16 nearest the chamber 15. As the perforated elevating vanes 18 in this first chamber 16 revolve, they agitate and automatically remove the initially cooled sand and after permitting the excess liquid and fine sand to drain therefrom, these vanes shower or cascade the sand onto the chute 21 therebeneath, and this chute automatically advances the coarser sand into the next succeeding chamber or compartment 16. Here the same agitating or mixing, further cooling, and subsequent elevating, drainage and cascading actions take place, and the sand is thus gradually cooled, washed and advanced toward the end of the drum 5 remote from the sand supply chute 22. When the sand has reached the last compartment 16 farthest from the inlet end of the drum 5, it will have been finally washed and cooled to the desired temperature, and the delivery chute 23 will eventually discharge the treated granular material in the form of a uniformly cooled constant stream of sand.

It is to be noted that the cooling liquid flows through the drum 5 in a direction opposite to the direction of advancement of the sand, thereby gradually reducing the sand temperature while simultaneously thoroughly washing and cleansing the sand particles. The liquid becomes gradually heated, and the counterflow of the cooling liquid, though gradual, will cause some of the valuable and fine sand particles to flow from the first compartment 16 into the adjacent settling compartment 15. The elevating vanes 17 in the initial compartment 15 have therefore been made narrower in order to avoid excessive agitation and to permit the fine sand particles to settle. The reclaimed fine sand particles are thereafter returned to the supply chute 22 and are re-admitted to the drum 5 with the incoming stream of warm sand; and the spent liquid which escapes over the dam afforded by the end head 9 will carry off floating material such as clay which would be highly objectionable if admitted to concrete mixture. The granular material or sand is thus thoroughly cleansed and cooled without loss of valuable ingredients, and the treatment is continuously and automatically effected.

From the foregoing detailed description it will be noted that my present invention provides an improved cooler for granular material such as sand or gravel, which is adapted to continuously, uniformly and automatically reduce the temperature of the material while advancing along a definite path. The present improved apparatus besides effecting cooling of the sand, also removes objectionable impurities without permitting escape of fine sand with the impurities, and any degree of cooling may be quickly and effectively accomplished by merely regulating the temperature of the fresh cooling liquid. By virtue of the fact that the cooling liquid is thoroughly mixed with the sand during advancement of the latter through the drum, all portions of the mass are uniformly treated and effectively washed, and the stationary chutes cooperate with the revolving flights or vanes to rapidly advance the sand through the successive chambers. By providing a smaller opening in the end head adjacent to the sand supply chute than at the opposite end of the drum, the flow of treating liquid is somewhat retarded and free escape of fine sand is prevented; but in cases where it is desired to also remove the fine sand particles, the settling chamber 15 may be omitted. As previously indicated, the size of the drum, the number of chambers 16, and the speed of rotation of the drum 5 may be varied to suit different conditions of operation, and the unit is adapted to treat granular materials other than sand and for purposes other than herein indicated. The improved apparatus has proven highly successful in actual use, and can obviously be manufactured and operated at moderate cost. The counter-flow principle of cooling has also been found far superior to the prior methods because of its improved efficiency, and the resultant uniformity of cooling with the use of minimum refrigerant.

It should be understood that it is not desired to limit this invention to the exact details of construction or to the precise mode of use of the apparatus herein shown and described, for various modifications within the scope of the appended claims may occur to persons skilled in the art.

I claim:

1. In combination, a rotary drum having therein partitions dividing the drum interior into a settling chamber at the granular material inlet end of the drum and a subsequent series of cooling chambers, said settling chamber having a series of narrow imperforate elevating vanes therein and said cooling chambers each having a series of wider perforated elevating vanes therein, a granular material supply chute for delivering fresh granular material through said settling chamber directly into the initial cooling chamber of said series, a series of fixed chutes within said rotary drum for advancing granular material cascaded by said vanes from each of said chambers to a succeeding chamber, and means for producing a flow of cooling liquid through said drum.

2. In combination, a rotary drum having therein partitions dividing the drum interior into a settling chamber at the granular material inlet end of the drum and a subsequent series of cooling chambers, said settling chamber having a series of narrow imperforate elevating vanes therein and said cooling chambers each having a series of wider perforated elevating vanes therein, a granular material supply chute for delivering fresh granular material through said settling chamber directly into the initial cooling chamber of said series, a series of fixed chutes within said rotary drum for advancing granular material cascaded by said vanes from each of said chambers to a succeeding chamber, means for admitting cooling liquid at a relatively high level to the end cooling chamber remote from said settling chamber, and means for effecting discharge of said liquid at a lower level from said settling chamber.

3. In combination, a rotary drum having a central through passage and an internal settling chamber at the granular material inlet end of the drum followed by a series of internal cooling chambers surrounding said passage, a series of relatively narrow granular material elevating vanes within said settling chamber, a series of wider granular material elevating vanes within each of said cooling chambers, and stationary granular material advancing chutes disposed within said passage and being cooperable with said vanes to constantly advance the granular material through said drum, the chute nearest said granular material inlet end being formed to deliver fresh material past said settling chamber and directly into the initial cooling chamber of said series.

4. In combination, a rotary drum having a central through passage and an internal settling chamber at the granular material end of the drum followed by a series of internal cooling chambers surrounding said passage, a series of relatively narrow granular material elevating vanes within said settling chamber, a series of wider granular material elevating vanes within each of said cooling chambers, stationary granular material advancing chutes disposed within said passage and being cooperable with said vanes to constantly advance the granular material through said drum, the chute nearest said granular material inlet end being formed to deliver fresh material past said settling chamber and directly into the initial cooling chamber of said series, and means for producing a constant flow of cooling liquid through said drum in a direction opposite to the direction of advancement of the granular material.

5. In combination, a rotary drum having therein annular partitions dividing the drum interior into a settling chamber at the granular material inlet end of the drum and a subsequent series of cooling chambers, said settling chamber having a series of narrow elevating vanes therein and said cooling chambers each having a series of wider elevating vanes therein, a granular material supply chute for delivering fresh granular material from a point beyond the end of the drum through said settling chamber and directly into the initial cooling chamber of said series, and a series of fixed chutes within said drum for advancing granular material cascaded by said vanes from each of said chambers to a succeeding chamber and out of the opposite end of the drum.

WILLIAM H. TAYLOR.